United States Patent
Takamuku et al.

(10) Patent No.: US 8,026,004 B2
(45) Date of Patent: Sep. 27, 2011

(54) NEGATIVE ACTIVE MATERIAL FOR A RECHARGEABLE LITHIUM BATTERY, METHOD FOR PREPARING THE SAME, AND RECHARGEABLE LITHIUM BATTERY INCLUDING THE SAME

(75) Inventors: Akira Takamuku, Yokohama (JP); Sung-Soo Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 918 days.

(21) Appl. No.: 11/641,947

(22) Filed: Dec. 20, 2006

(65) Prior Publication Data

US 2007/0166615 A1  Jul. 19, 2007

(30) Foreign Application Priority Data

Dec. 21, 2005  (JP) .................................. 2005-367912

(51) Int. Cl.
  *H01M 4/48* (2010.01)
  *C01G 31/02* (2006.01)
(52) U.S. Cl. ............... 429/231.2; 429/231.5; 429/218.1; 423/594.8; 252/182.1
(58) Field of Classification Search ............ 429/47–347, 429/218.1, 231.2, 231.5; 252/182.1
See application file for complete search history.

(56) References Cited

U.S. PATENT DOCUMENTS

| | | | |
|---|---|---|---|
| 6,413,669 B1 * | 7/2002 | Takeuchi et al. | 429/218.1 |
| 2001/0055711 A1 * | 12/2001 | Ito et al. | 429/44 |
| 2003/0049541 A1 * | 3/2003 | Inagaki et al. | 429/332 |
| 2003/0211396 A1 * | 11/2003 | Kobayashi et al. | 429/231.95 |
| 2004/0005265 A1 * | 1/2004 | Chiang et al. | 423/306 |
| 2005/0079417 A1 * | 4/2005 | Kim et al. | 429/231.2 |
| 2005/0175897 A1 * | 8/2005 | Jung et al. | 429/223 |
| 2006/0088766 A1 * | 4/2006 | Kim et al. | 429/231.2 |
| 2008/0145758 A1 * | 6/2008 | Kim et al. | 429/219 |
| 2008/0305397 A1 * | 12/2008 | Kobayashi et al. | 429/231.5 |
| 2009/0023070 A1 * | 1/2009 | Tokita et al. | 429/231.5 |
| 2009/0068566 A1 * | 3/2009 | Park et al. | 429/331 |

FOREIGN PATENT DOCUMENTS

| | | |
|---|---|---|
| CN | 1 607 687 | 4/2005 |
| JP | 06-302320 | 10/1994 |
| JP | 2002-216753 | 8/2002 |
| JP | 2003-068305 | 3/2003 |

OTHER PUBLICATIONS

Machine translation of JP 2003-068305 (Mar. 2003).*
Machine translation of JP 06-302320 (Oct. 1994).*
Yamamoto, et al., "Anode Properties of Li1+xV1–xO2 for Lithium Secondary Batteries", 2002 Japanese Battery Conference (Preview No. 3B05).

* cited by examiner

*Primary Examiner* — Ula C Ruddock
*Assistant Examiner* — Amanda Barrow
(74) *Attorney, Agent, or Firm* — Lee & Morse, P.C.

(57) ABSTRACT

A negative active material for a rechargeable lithium battery may include a compound powder represented by the following formula 1

$$Li_xM_yV_zO_{2+d}$$ [Formula 1]

where $1 \leq x \leq 2.5$, $0 \leq y \leq 0.5$, $0.5 \leq z \leq 1.5$, $0 \leq d \leq 0.5$, and M is an element selected from Al, Cr, Mo, Ti, W, Zr, and combinations thereof. The compound powder may include a multi-faced particle that has a plurality of flattened parts on a particle surface at the plan view of the multi-faced particle. The multi-faced particle may have at least three ridgelines at a boundary between adjacent flattened parts. At least one of the ridgelines may be formed by adjacent flattened parts having an angle of at least 90°. A ratio of a length (L) of each ridgeline and the maximum diameter ($R_{max}$) of the multi-faced particle may be greater than 0.1.

10 Claims, 5 Drawing Sheets

NEGATIVE ACTIVE MATERIAL FOR A RECHARGEABLE LITHIUM BATTERY, METHOD FOR PREPARING THE SAME, AND RECHARGEABLE LITHIUM BATTERY INCLUDING THE SAME

BACKGROUND OF THE INVENTION

1. Field of the Invention

The present invention relates to a negative active material for a rechargeable lithium battery, a method for preparing a negative active material for a rechargeable lithium battery, and a rechargeable lithium battery. More particularly, the present invention relates to a negative active material for a rechargeable lithium battery that shows high capacity due to high energy density per unit volume, high discharge potential, long cycle-life, and excellent safety, a method for preparing a negative active material for a rechargeable lithium battery, and rechargeable lithium battery.

2. Description of the Related Art

Various carbon-based materials, e.g., artificial and natural graphite, hard carbon, etc., may be used as a negative active material of a rechargeable lithium battery. These materials can intercalate and deintercalate lithium ions. Graphite may increase discharge voltages and energy density for a battery due to its low discharge potential, e.g., about 0.2V, compared to lithium. A battery using graphite as a negative active material may have a high average discharge potential, e.g., about 3.6V, and an excellent energy density. Graphite is most comprehensively used among the aforementioned carbon-based materials since graphite guarantees better battery life cycle due to its outstanding reversibility.

However, graphite has a low density (its theoretical density is 2.2 g/cc). Consequently, graphite has a low capacity in terms of energy density per unit volume, and, thus, has a low charge and discharge capacity when used as a negative active material. Further, the use of graphite may present potential risks, e.g., explosion or combustion, when a battery is misused, overcharged, etc., since graphite may react to an organic electrolyte at a high discharge voltage.

In order to solve these problems, a great deal of research on an oxide negative electrode has recently been performed. One material investigated has been amorphous tin oxide, which has a high capacity per weight (800 mAh/g). However, use of amorphous tin oxide has resulted in critical defects, e.g., a high initial irreversible capacity of up to 50%. In other words, $2^{nd}$ cycle discharge capacity may be decreased up to less than one half of an initial discharge capacity. Additionally, amorphous tin oxide has a discharge potential of more than 0.5V, and its charge and discharge profile has a broad voltage variation. Consequently, tin oxide may not be suitable for use in a battery. Further, some of the tin oxide tends to be reduced into tin metal during the charge or discharge reaction, which further reduces its acceptability for use in a battery.

Other materials for use as a negative active material, e.g., $Li_aMg_bVO_c$ (0.05≦a≦3, 0.12≦b≦2, 2≦2c-a-2b≦5) and $Li_{1.1}V_{0.9}O_2$, have been proposed. However, these do not sufficiently resolve all of the above problems.

SUMMARY OF THE INVENTION

The present invention is therefore directed to a negative active material for a rechargeable lithium battery, a method for preparing the same, and a rechargeable lithium battery using the same, which substantially overcome one or more of the problems due to the limitations and disadvantages of the related art.

It is therefore a feature of an embodiment of the present invention to provide a negative active material for a rechargeable lithium battery that has a high capacity due to high energy density per unit volume.

It is another feature of an embodiment of the present invention to provide a negative active material for a rechargeable lithium battery that has a high discharge potential.

It is yet another feature of an embodiment of the present invention to provide a negative active material for a rechargeable lithium battery that has a long cycle-life.

It is still another feature of an embodiment of the present invention to provide a very safe negative active material.

It is yet another feature of an embodiment of the present invention to provide a method for preparing a negative active material for a rechargeable lithium battery having one or more of the above features.

It is still yet another feature of an embodiment of the present invention provides a rechargeable lithium battery including a negative active material having one or more of the above features.

At least one of the above and other features and advantages of the present invention may be realized by providing a negative active material for a rechargeable lithium battery, including a compound powder represented by formula 1,

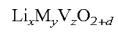 [Formula 1]

$Li_xM_yV_zO_{2+d}$ where 1≦x≦2.5, 0≦y≦0.5, 0.5≦z≦1.5, 0≦d≦0.5, and M is an element selected from Al, Cr, Mo, Ti, W, Zr, and combinations thereof. The compound powder may include a multi-faced particle that has a plurality of flattened parts, wherein the multi-faced particle has at least three ridgelines at a boundary between adjacent flattened parts, and at least one of the ridgelines is formed by adjacent flattened parts at an angle of at least 90°.

20% to 100% of the particles of the compound powder may be multi-faced particles. The compound powder may have an average diameter ranging from about 1 μm to 100 μm. A ratio of a length (L) of each ridgeline and a maximum diameter ($R_{max}$) of the multi-faced particle is greater than about 0.1.

At least one of the above and other features and advantages of the present invention may be realized by providing a method for preparing negative active material for a rechargeable lithium battery, the method including preparing a mixed powder by mixing a vanadium-containing raw powder, a lithium-containing raw powder, an M element-containing raw powder, where M is an element selected from Al, Cr, Mo, Ti, W, Zr, and combinations thereof, subjecting the mixed powder to a first heat-treatment at about 500 to 900° C. for about 1 to 5 hours under an oxidizing or reducing atmosphere to obtain a lithium-vanadium-based oxide powder, press-forming the powder, subjecting the press-formed powder to a second heat-treatment at about 900 to 1400° C. for about 3 to 10 hours under a reducing atmosphere, and grinding the heated press-formed powder.

The vanadium-containing raw powder may include at least one of metal vanadium, VO, $V_2O_3$, $V_2O_4$, $V_2O_5$, $V_4O_7$, $VOSO_4·nH_2O$, $NH_4VO_3$, and combinations thereof. The lithium-containing raw powder may include at least one of lithium carbonate, lithium hydroxide, lithium nitrate, lithium acetate, and combinations thereof. The M element-containing raw powder may include at least one of the M element-containing oxide, the M element-containing hydroxide, and combinations thereof.

The reducing atmosphere may be selected from a nitrogen atmosphere, an argon atmosphere, a $N_2/H_2$ mixed gas atmosphere, a $CO/CO_2$ mixed gas atmosphere, and a helium atmosphere. The reducing atmosphere of the second heat-treatment may be used in the first heat-treatment.

At least one of the above and other features and advantages of the present invention may be realized by providing a rechargeable lithium battery, including a positive electrode including a positive active material capable of intercalating and deintercalating lithium, a negative electrode including a negative active material capable of intercalating and deintercalating lithium, and an electrolyte, wherein the negative active material includes a compound powder represented by the following formula 1, $Li_xM_yV_zO_{2+d}$ [Formula 1]

where $1 \leq x \leq 2.5$, $0 \leq y \leq 0.5$, $0.5 \leq z \leq 1.5$, $0 \leq d \leq 0.5$, and M is an element selected from Al, Cr, Mo, Ti, W, Zr, and combinations thereof, the compound powder including a multi-faced particle that has a plurality of flattened parts, wherein the multi-faced particle has at least three ridgelines at a boundary between adjacent flattened parts, and at least one of the ridgelines is formed by adjacent flattened parts at an angle of at least 90°.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
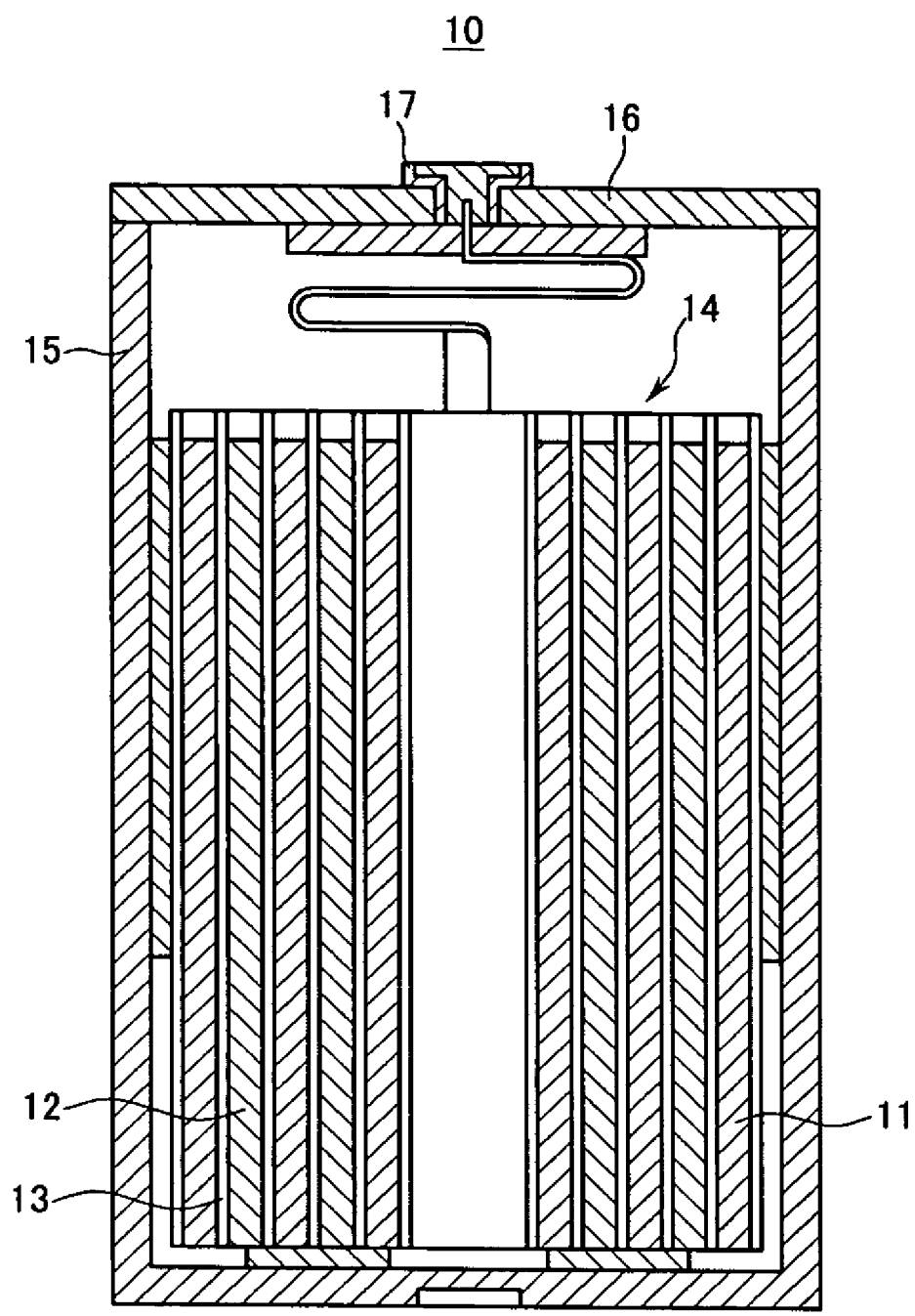
FIG. 1 illustrates a schematic cross sectional view of a rechargeable lithium battery according to an embodiment of the present invention.

Japanese Patent Application No. 2005-367912 filed on Dec. 21, 2005, in the Japan Patent Office and entitled: "Negative Active Material for Rechargeable Lithium Battery, Method for Preparing the Same, and Rechargeable Lithium Battery Including the Same," and Korean Patent Application No. 10-2006-0131105 filed in the Korean Intellectual Property Office on Dec. 20, 2006 are incorporated by reference herein in their entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic cross sectional view of a rechargeable lithium battery according to an embodiment of the present invention.

Referring to FIG. 1, the rechargeable lithium battery 10 may be fabricated by placing an electrode assembly 14 inside a case 15, injecting an electrolyte into the case 15, and sealing the case 15, e.g., using a cap plate 16 and a gasket 17. The electrode assembly 14 may include a positive electrode 11, a negative electrode 12, and a separator 13 interposed between the positive electrode 11 and the negative electrode 12.

Positive Electrode

The positive electrode may include a positive active mass including a positive active material, a conductive agent, and a binder; and a positive current collector on which the positive active mass may be disposed. The positive active mass may be formed in a disk-shape to fabricate a pellet-shaped or sheet-shaped electrode.

The positive active material may be a material that can reversibly intercalate and deintercalate lithium, e.g., a Li-containing compound, oxide, sulfide, etc. The positive active material may include at least one of Mn, Co, Ni, Fe, Al, and combinations thereof. Examples of the positive active material include $LiMn_2O_4$, $LiCoO_2$, $LiNiO_2$, $LiFeO_2$, $LiNi_{1/3}CO_{1/3}Mn_{1/3}O_2$, $LiNi_{0.8}CO_{0.2}O_2$, etc. The binder may include polyvinylidene fluoride (PVDF), polytetrafluoro ethylene (PTFE), etc. The conductive agent may include carbon, e.g., carbon black, ketjen black, graphite, etc. The positive current collector may include a metal foil or a metal net formed of, e.g., aluminum, stainless steel, etc.

Negative Electrode

The negative electrode may include a negative active mass including a negative active material, a conductive agent, and a binder; and a negative current collector on which the negative active mass may be disposed. The negative active mass may be formed in a disk-shape to fabricate a pellet-shaped or sheet-shaped electrode.

The negative active material may include a material of the following formula 1 that can reversibly intercalate and deintercalate lithium. The material of formula 1 may be a compound power having a layered structure.

$Li_xM_yV_zO_{2+d}$ [Formula 1]

In the above formula 1, $1 \leq x \leq 2.5$, $0 \leq y \leq 0.5$, $0.5 \leq z \leq 1.5$, $0 \leq d \leq 0.5$, and M is an element selected from Al, Cr, Mo, Ti, W, Zr, and combinations thereof.

The negative active material, including the compound of the above formula 1, may increase an energy density per unit volume due to a high density, and may have excellent stability due to low reactivity with an electrolyte compared to a conventional negative active material including a carbon material.

Compounds represented by the above formula 1 may be synthesized by substituting for cobalt in the conventional active material $LiCoO_2$, vanadium and an element other than Li, selected from, e.g., Al, Mo, W, Ti, Cr, Zr, and a combination thereof. Compounds represented by the above formula 1 may have a discharge potential and cycle-life characteristics similar to those of graphite, and may provide a capacity per unit volume more than 1000 mAh/cc when used for the negative active material.

R-3M structured $LiCoO_2$ or $LiNiO_2$, primarily used for the positive active material, may have a layered structure of oxygen, Li, and a transition element, so that some parts of lithium layers are intercalated/deintercalated when used for the lithium rechargeable battery. The R-3M structure is a layered structure in which Li and oxygen, and a transition element and oxygen, are alternatively laminated.

In a $LiVO_2$ structure, the V metal ion layer (Li is substituted with the third metal) may be disposed in the oxygen ion octahedron site between the oxygen ions having a hexagonal closed packing; and Li ion may be disposed in the lower layer of the octahedron site. If lithium is intercalated, thereby providing $Li_2VO_2$, the structure may also include a V metal ion layer (Li is substituted with the third metal), an oxygen ion layer, a Li layer, an oxygen ion layer, and a V metal ion layer (Li is substituted with the third metal).

In order to facilitate the intercalation/deintercalation of lithium at a low potential, some Li of the V metal ion layer may be substituted with another third metal (M element) to increase the lattice constant, i.e., a distance between unit cells along an axis a. Thereby, the lithium layer may be broader, and may facilitate the intercalation/deintercalation of the lithium in the crystal structure. The easy intercalation/deintercalation of the lithium may increase the diffusion rate of the lithium upon charging and discharging the battery, so that the cycle-life and the charge and discharge efficiency of the battery may be improved.

Further, the compound powder for the negative active material may include multi-faced particle, i.e., having a plurality of flattened parts on a surface thereof, present in a percentage of about 20% to 100% of a total number of particles in the compound powder. The multi-faced particle may have a plurality of flattened parts and more than three ridgelines, i.e., boundary lines, of each flattened part. A boundary line qualifying as a ridgeline may satisfy the condition that two adjacent flattened parts form an angle of about 90° or more, but less than about 180°. The relationship between a length L of a ridgeline and a maximum diameter $R_{max}$ of the multi-faced particle may satisfy the relationship $L/R_{max} > 0.1$.

Figure 2:
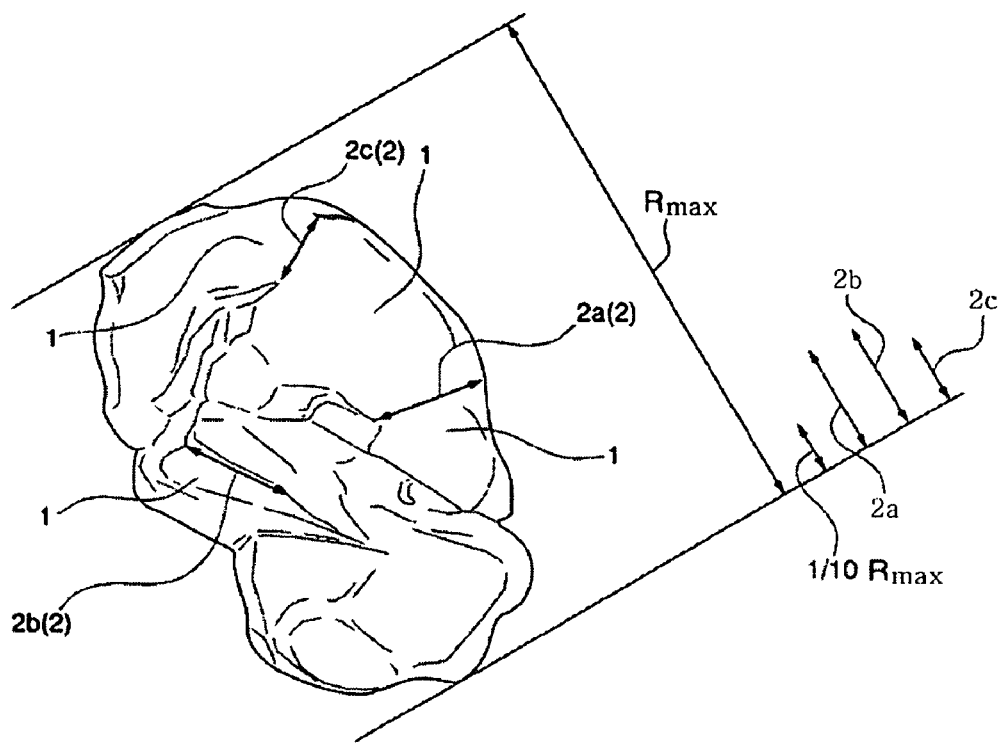
FIG. 2 illustrates a schematic view of a multi-faced particle according to an embodiment of the present invention.

FIG. 2 schematically illustrates a multi-faced particle according to an embodiment of the present invention. The surface of the multi-faced particle shown in FIG. 2 has a plurality of flattened parts 1. In addition, there are several boundary lines 2 of the flattened part 1.

A ridgeline is a boundary line satisfying the condition that the relationship between the length L thereof and the maximum diameter $R_{max}$ thereof is $L/R_{max} > 0.1$. Thus, the three boundary lines 2a, 2b, and 2c illustrated in FIG. 2 qualify as ridgelines 2.

Herein, an improved crystalline structure for use as a negative active material may be identified when the ridgeline is defined by two adjacent flattened parts forming an angle of about 90° or more. A negative active material having such a ridgeline may have an excellent crystalline structure, and may facilitate the intercalation/deintercalation of lithium ions. When the angle between two flattened parts is less than about 90°, the crystalline structure of the negative active material may be insufficient.

Further, when the relationship of the length L of the boundary line 2 and the maximum particle diameter $R_{max}$ satisfies the condition that $L/R_{max} > 0.1$, the crystalline structure of the negative active material may be improved. A negative active material having more than three ridgelines may provide excellent crystalline structure for facilitating the intercalation/deintercalation of lithium ions. Thus, the charge and discharge capacity of the negative active material may be improved. When the condition $L/R_{max} > 0.1$ is not satisfied, or when there are less than three ridgelines, the crystalline of the negative active material may be insufficient, so that the charge and discharge capacity may not be improved.

As noted above, the compound powder may include the multi-faced particle described above as about 20% to 100% of the total number of particles. When the percentage of the multi-faced particle is less than about 20%, the overall crystalline structure of the negative active material may be deteriorated, so that the charge and discharge capacity may be diminished.

The compound powder may have an average diameter ranging from about 1 μm to 100 μm. According to one embodiment, the compound powder may have an average diameter ranging from about 5 μm to 80 μm. When the average particle diameter is less than 1 μm, a side reaction with the non-aqueous electrolyte may occur. When the average particle diameter is more than 100 μm, the charge density may be deteriorated when preparing the negative electrode.

The binder for the negative electrode may be any organic or inorganic material that may be dispersed or dissolved in a solvent along with the negative active material and may bind the negative active material after solvent removal. Further, the binder may be a material that may bind the negative active material by mixing the negative active material and then press-forming. The binder may be a vinyl-based resin, a cellulose-based resin, a phenol resin, a thermoplastic resin, a thermosetting resin, etc. Specifically, the binder may be PVDF, polyvinyl alcohol (PVA), carboxyl methyl cellulose (CMC), styrene butadiene rubber (SBR), etc. In addition to the negative active material and binder, the negative electrode may further include a conductive agent, e.g., carbon black, graphite powder, a carbon fiber, a metal powder, a metal fiber, etc. The negative current collector may include a metal foil or a metal net formed of, e.g., copper.

Non-Aqueous Electrolyte

The non-aqueous electrolyte may be an organic electrolyte solution including an aprotic solvent and a lithium salt dissolved therein.

The aprotic solvent may include propylene carbonate (PC), ethylene carbonate (EC), butylene carbonate (BC), benzo nitrile, aceto nitrile, tetrahydrofuran (THF), 2-methyltetrahydrofuran, γ-butyrolactone, dioxolan, 4-methyl dioxolan, N,N-dimethylformamide (DMF), dimethyl acetamide (DMAC), dimethyl sulfoxide (DMSO), dioxane, 1,2-dimethoxyethane (DME), sulfolane, dichloroethane, chlorobenzene, nitrobenzene, dimethyl carbonate (DMC), methyl-ethyl carbonate (MED), diethyl carbonate (DEC), methyl propyl carbonate (MPC), methylisopropyl carbonate (MIPC), ethylbutyl carbonate, dipropyl carbonate, diisopropyl carbonate, dibutyl carbonate, diethylene glycol (DEG), dimethyl ether, etc. The aprotic solvent may be in combination. According to an embodiment of the present invention, the aprotic solvent may include at least one of PC, EC, and BC, and at least one of DMC, MEC, and DEC.

The lithium salt may be selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are integers, LiCl, LiI, and combinations thereof. According to an embodiment of the present invention, the lithium salt may be $LiPF_6$.

Alternatively, a polymer electrolyte may also be used. The polymer electrolyte may include a polymer, e.g., polyethylene oxide (PEO), polyvinyl acetate (PVA), etc., and the above lithium salt, or may include a polymer having a good swelling property in which an organic electrolyte solution is impregnated instead of the aforementioned non-aqueous electrolyte solution.

Separator

The separator may include a polymer porous film of a polyolefin resin, e.g., polypropylene, polyethylene, etc.

A Method for Preparing a Negative Active Material

A method for preparing negative active material for a rechargeable lithium battery according to an embodiment may include preparing a mixed powder, press-forming the powder to an assembled powder or a pellet, subjecting the assembled powder or the pellet to a second heat-treatment, and grinding the assembled powder or the pellet.

In preparing the mixed powder, a vanadium-containing raw powder, a lithium-containing raw powder, an M element-containing raw powder, where M is an element selected from Al, Cr, Mo, Ti, W, Zr, and combinations thereof, may be mixed.

The vanadium-containing raw powder, lithium-containing raw powder, and M element-containing raw powder may be mixed at an appropriate ratio to obtain a compound of the above formula 1 having an intended compound composition.

The vanadium-containing raw powder may include at least one of metal vanadium, VO, $V_2O_3$, $V_2O_4$, $V_2O_5$, $V_4O_7$, $VOSO_4 \cdot nH_2O$, $NH_4VO_3$, and combinations thereof. The lithium-containing raw powder may include at least one of lithium compounds, e.g., lithium carbonate, lithium hydroxide, lithium nitrate, lithium acetate, and combinations thereof. The M element-containing raw powder may include at least one of M element compounds, e.g., M-element-containing oxide, M element-containing hydroxide, and combinations thereof. Specific examples of the M element-containing raw powder may include $Al(OH)_3$, $Al_2O_3$, $Cr_2O_3$, $MoO_3$, $TiO_2$, $WO_3$, $ZrO_2$, and combinations thereof.

During the first heating step, the mixed powder may be heated under an oxidation or a reduction atmosphere at about 500° C. to 1400° C. for about 1 to 5 hours to provide a lithium-vanadium based oxide. If the heating temperature falls outside the range from about 500° C. to 1400° C., impurities, e.g., $Li_3VO_4$, may be generated, which may deteriorate battery capacity and cycle-life. Further, when the heating is less than about 1 hour, the reactivity of the prepared negative active material may be insufficient, and, when the heating is more than about 5 hours, the process has disadvantages.

The reducing atmosphere may be a nitrogen atmosphere, an argon atmosphere, a $N_2/H_2$ mixed gas atmosphere, a $CO/CO_2$ mixed gas atmosphere, or a helium atmosphere. Herein, the oxygen concentration at the oxidation atmosphere may be as low as possible. When the oxygen concentration is too high, the mixture may be synthesized into other materials having too much oxygen, or may be mixed with other impurities having more than two oxidation numbers, in which the metal oxide may be oxidized.

Subsequently, the obtained mixed powder may be pressed and shaped into an assembled powder or a pellet. The assembled powder or pellet may be fabricated using known techniques. In the case of a pellet, a pellet having a density ranging from about 1.7 g/cm³ to 5 g/cm³ may be formed. According to another embodiment, the density of the pellet may range from about 2 g/cm³ to 4 g/cm³. When the density of the assembled powder or the pellet is less than 1.7 g/cm³, the contacting property between the vanadium-included raw powder, lithium-included raw powder, and M element-included raw powder may deteriorate, and realization of a compound powder including the multi-faced particles may be difficult. The upper limit of the press or density of the pellet may not be predetermined, but may be set considering manufacturing devices to be used, e.g., the assembling device, the pelleting device, etc. However, if it is possible to generate the assembled powder or the pellet outside the upper limit thereof, they may be prepared over the upper limit.

During the second heating step, the assembled powder or the pellet may be heated under the reducing atmosphere at about 900° C. to 1200° C. for about 3 to 10 hours. When the heating temperature falls outside the temperature range from 900° C. to 1400° C., impurities, e.g., $Li_3VO_4$, may be generated, which may deteriorate battery capacity and cycle-life. Further, when the heating duration is less than about 1 hour, the reactivity of the prepared negative active material may be insufficient, and, when it is more than about 5 hours, the process may be disadvantageous.

The type of the reducing atmosphere may be the same as in the first heating step.

In the pulverizing step, the assembled powder or the pellet may be pulverized to provide a compound powder. The pulverization may be performed to provide an average particle diameter of the compound powder of between about 1 μm to 100 μm.

A negative active material may be obtained from the above-mentioned manufacturing method.

The obtained negative active material may have the multi-faced particle at a percentage of about 20% to 100% of all particles. Further, the compound powder for the negative active material may include compounds represented by the above formula 1, reproduced below for convenience:

$$Li_xM_yV_zO_{2+d}$$ [Formula 1]

where, $1 \leq x \leq 2.5$, $0 \leq y \leq 0.5$, $0.5 \leq z \leq 1.5$, $0 \leq d \leq 0.5$, and M is an element selected from Al, Cr, Mo, Ti, W, Zr, and combinations thereof.

A Method for Fabricating a Rechargeable Lithium Battery

Hereinafter, a method of fabricating a rechargeable lithium battery according to an embodiment of the present invention will be described.

The positive electrode may be fabricated as follows: a binder, e.g., PVFD, may be dissolved in a solvent, e.g., N-methylpyrrolidone (NMP), a positive active material and a conductive agent may be mixed with the resulting solution to prepare a positive electrode slurry, the positive electrode slurry may be coated on a current collector, dried and then cut into an appropriate size.

The negative electrode may be fabricated as follows: a binder, e.g., PVFD, may be dissolved in a solvent, e.g., NMP, a negative active material and a conductive agent as needed may be mixed with the resulting solution to prepare a negative electrode slurry, the negative electrode slurry may be coated on a current collector, dried and then cut into an appropriate size.

A separator may be interposed between the above fabricated positive and negative electrodes to form an electrode assembly. The electrode assembly may be housed in a battery case, e.g., a cylindrical case, electrolyte may then be injected into the case, and then the case may be sealed to form a battery.

The following examples illustrate the present invention in more detail. However, it is understood that the present invention is not limited by these examples.

Experimental Example 1

Evaluation of a Negative Active Material

Example 1

$V_2O_4$ powder and $LiCO_3$ powder were mixed to provide a mixed powder. Herein, the mole ratio of lithium and vanadium in the mixed powder was Li:V=1.1:0.9.

Herein, the mixed powder was heated under the nitrogen atmosphere at 900° C. for 3 hours. Several drops of 1 wt % of polyvinyl alcohol aqueous solution were added to 5 g of the heated powder, filled into a disk-shaped mold having a diameter of 20 mm, and pressed at a 5 t pressure to provide a disk pellet.

The provided pellet was heated under the nitrogen atmosphere at 1100° C. for 7 hours. The heated pellet was pulverized using a mortar to provide a negative active material of Example 1. The provided negative active material may be represented by the following formula: $Li_{1.1}V_{0.9}O_2$.

Example 2

$V_2O_4$ powder, $TiO_2$ powder, and $LiCO_3$ powder were mixed to provide a mixed powder. Herein, the mole ratio of lithium, vanadium, and titanium was Li:V:Ti=1.1:0.9:0.01.

Then, the mixed powder was heated under the nitrogen atmosphere at 900° C. for 3 hours. Several drops of 1 wt % of polyvinyl alcohol aqueous solution were added to 5 g of the heated powder, a disk-shaped mold having a diameter of 20 mm was filled with the heated power and pressed at a 5 t pressure to provide a disk pellet.

The provided pellet was heated under the nitrogen atmosphere at 1100° C. for 7 hours. The heated pellet was pulverized using a mortar to provide a negative active material of Example 2. The provided negative active material may be represented by the following formula: $Li_{1.1}V_{0.9}Ti_{0.01}O_2$.

Comparative Example 1

$V_2O_4$ powder and $LiO_3$ powder were mixed to provide a mixed powder. Herein, the mole ratio of lithium and vanadium was Li:V=1.1:0.9.

Then, the mixed powder was heated under the nitrogen atmosphere at 1100° C.

The heated pellet was pulverized using a mortar to provide a negative active material of Comparative Example 1. The provided negative active material was represented by the following formula: $Li_{1.1}V_{0.9}O_2$, which was the same formula as in Example 1.

Figure 3:
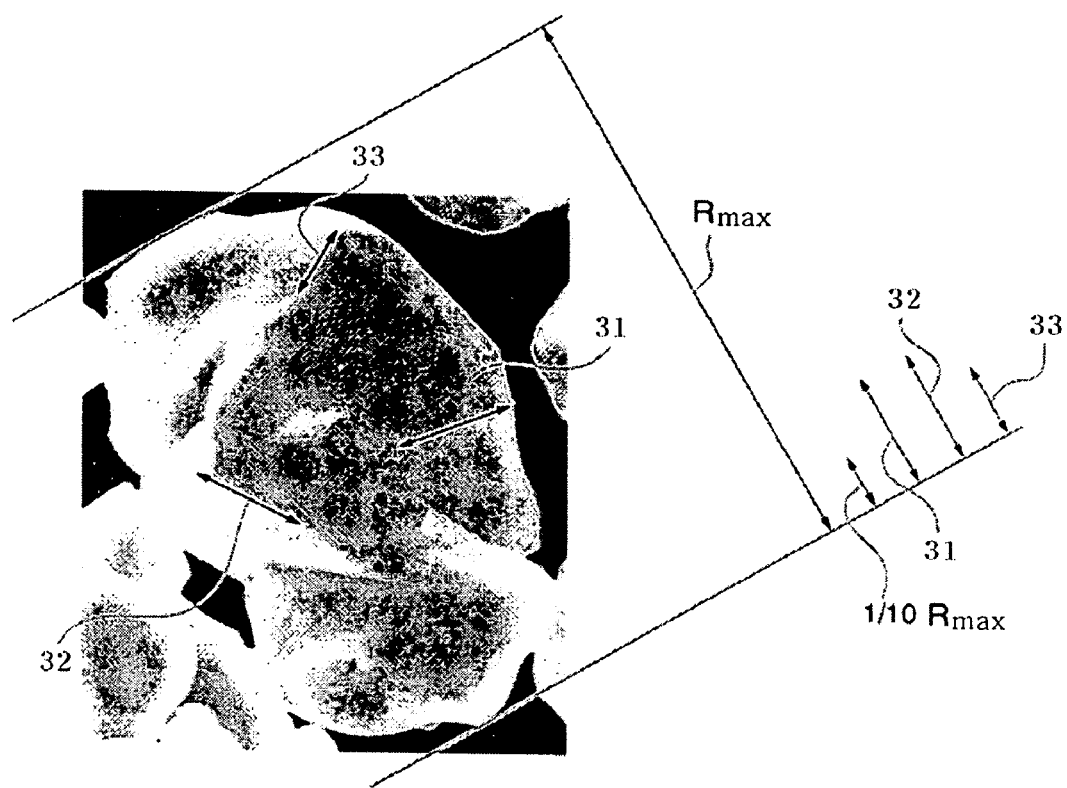
FIG. 3 is a scanning electron microscope (SEM) photograph of the multi-faced particle that composes the negative active material according to Example 1.

Negative active materials prepared from Example 1 and Comparative Example 1 were photographed by a scanning electron microscope. FIG. 3 illustrates a SEM photograph of the negative active material according to Example 1, and FIG. 4 illustrates a SEM photograph of the negative active material according to Comparative Example 1.

As shown in FIG. 3, a particle of the negative active material has a maximum diameter $R_{max}$ of 26 μm. Further, the particle surface has a plurality of flattened parts and a plurality of boundary lines formed by a plurality of the adjacent flattened parts. Among boundary lines, ridgelines 31, 32, and 33 satisfy the conditions that the two adjacent flattened parts form an angle of 90° or more; and that the ratio between the maximum diameter, $R_{max}$, of the multi-faced particle and the length L is greater than 0.1. Ridgeline 31 has a length of 5.7 μm and an angle of 110°. Ridgeline 32 has the length of 5.1 μm and an angle of 106°. Ridgeline 33 has a length of 3.1 μm and an angle of 134°.

Figure 4:
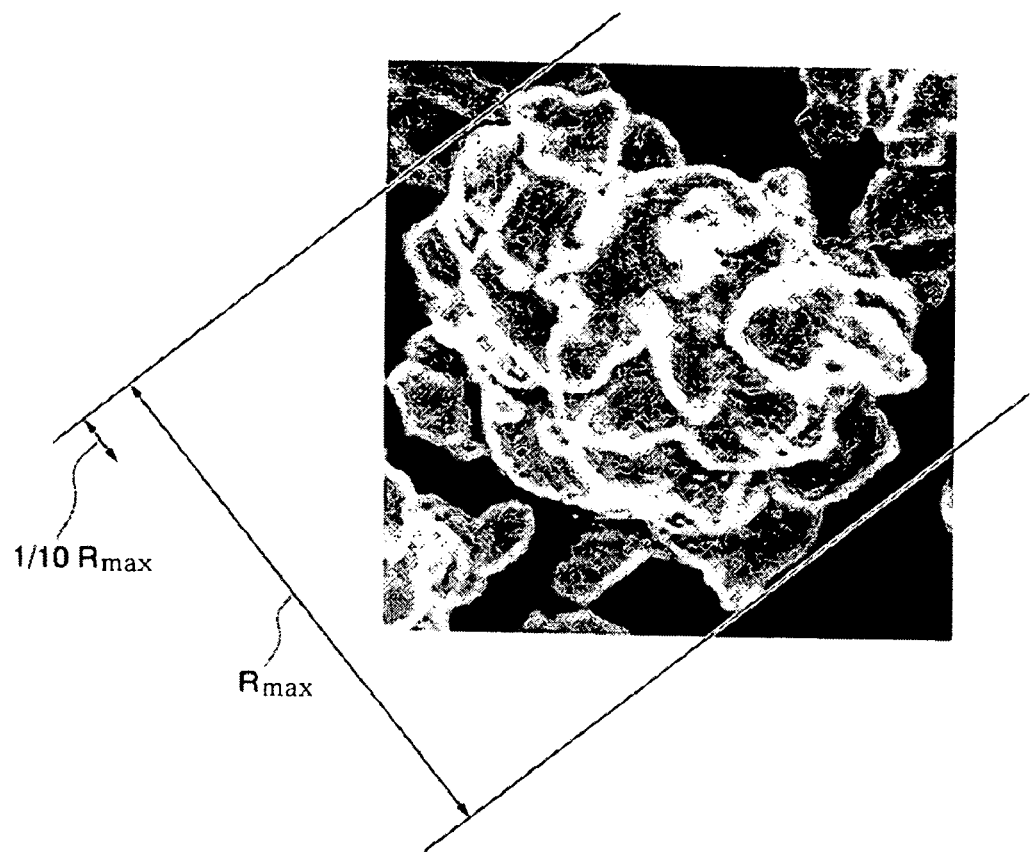
FIG. 4 is a scanning electron microscope (SEM) photograph of the multi-faced particle that composes the negative active material according to Comparative Example 1.

On the other hand, the negative active material particle shown in FIG. 4 has a maximum diameter $R_{max}$ of 24 μm. Further, the particle is spherical, and no boundary lines that qualify as ridgelines are apparent.

Experimental Example 2

Electrochemical Analysis of Negative Active Material

Example 3

80 parts by mass of the negative active material according to Example 1, 10 parts by mass of carbon black (conductive agent), 10 parts by mass of poly fluorovinylidene were dissolved in NMP to provide a slurry. The slurry was coated on a Cu foil, dried and cut into a suitable size to provide a negative electrode. A positive electrode of a metal lithium was also provided.

Between the negative electrode and the positive electrode, a separator of polypropylene was interposed to form an electrode assembly. Then, the electrode assembly was inserted in battery case. An electrolyte solution of 1.3M $LiPF_6$ was dissolved in a mixed solvent of EC and DMC (volume ratio of EC:DMC=3:7). The electrolyte solution was injected into the battery housing, and the battery housing was sealed to provide a cell according to Example 3.

Example 4

A cell was fabricated in accordance with the same procedure as in Example 3, except that the negative active material according to Example 2 was used instead of that according to Example 1.

Comparative Example 2

A cell was fabricated in accordance with the same procedure as in Example 3, except that the negative active material according to Comparative Example 1 was used instead of that according to Example 1.

Figure 5:
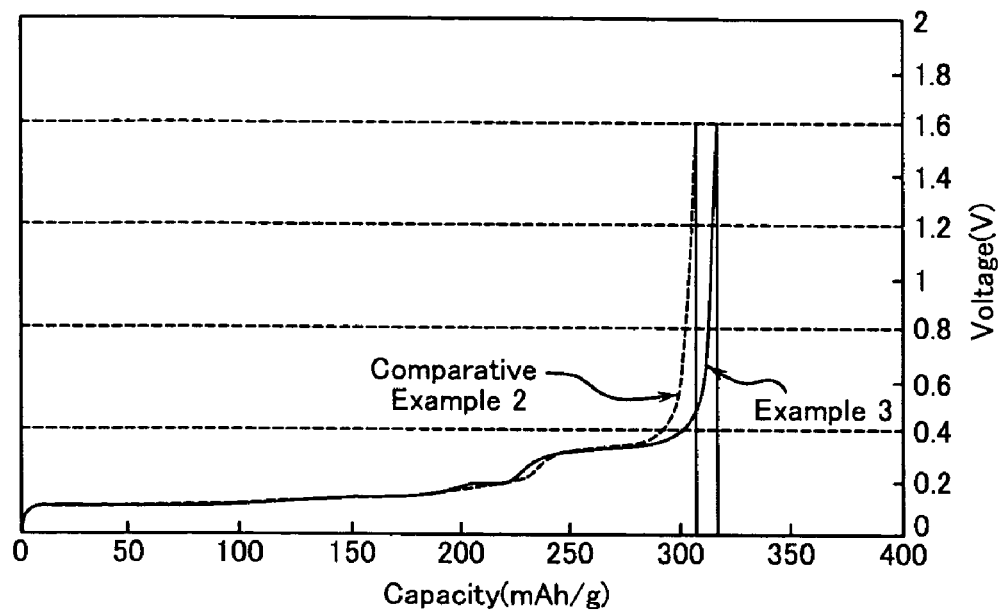
FIG. 5 is a graph of discharge curve lines of the rechargeable lithium battery cells according to Example 3 and Comparative Example 2.

Cells according to Examples 3 and 4, and Comparative Example 2 were charged in the constant current at 0.2 C until the charge end voltage was 0 V, then charged at a constant voltage for 3 hours. Then, the cells were discharged to the voltage of 2.0 V at 0.2 C. FIG. 5 shows the discharge curve line of cells according to Example 3, and Comparative Example 2. Table 1 shows the discharge capacity and the charge and discharge efficiency of each cell.

TABLE 1

|  | Discharge capacity (mAh/g) | Charge and discharge efficiency (%) |
| --- | --- | --- |
| Example 3 | 317.1 | 92.0 |
| Example 4 | 319.0 | 92.0 |
| Comparative Example 2 | 305.3 | 89.8 |

As shown in FIG. 5 and Table 1, negative active materials of Examples 1 and 2 had a superior charge and discharge capacity, and charge and discharge efficiency compared to those of Comparative Example 1. This is because the crystalline structure of the negative active materials according to Examples 1 and 2 is better than that of Comparative Example 1.

The negative active material for a rechargeable lithium battery may improve an energy density per unit volume, may improve charge and discharge capacity, and, thereby, may provide a rechargeable lithium battery having a high energy density and a high charge and discharge capacity.

According to the method for preparing a negative active material for a rechargeable lithium battery, a negative active material for a rechargeable lithium battery having an energy density per unit volume and charge and discharge capacity can be prepared.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method for preparing negative active material for a rechargeable lithium battery, the method comprising:
    preparing a mixed powder by mixing a vanadium-containing raw powder and a lithium-containing raw powder, or by mixing a vanadium-containing raw powder, a lithium containing raw powder, and an M element-containing raw powder, where the M element includes at least one of Al, Cr, Mo, Ti, W, and Zr;
    subjecting the mixed powder to a first heat-treatment at about 500° C. to about 900° C. for about 1 to about 5 hours under a first atmosphere to obtain a lithium-vanadium-based oxide powder;
    press-forming the lithium-vanadium-based oxide powder;
    subjecting the press-formed powder to a second heat-treatment at about 900° C. to about 1400° C. for about 3 to about 10 hours under a second atmosphere that is a reducing atmosphere; and
    grinding the heated press-formed powder.

2. The method as claimed in claim 1, wherein the vanadium-containing raw powder includes at least one of vanadium metal, VO, $V_2O_3$, $V_2O_4$, $V_2O_5$, $V_4O_7$, $VOSO_4 \cdot nH_2O$, and $NH_4VO_3$.

3. The method as claimed in claim 1, wherein the lithium-containing raw powder includes at least one of lithium carbonate, lithium hydroxide, lithium nitrate, and lithium acetate.

4. The method as claimed in claim 1, wherein the M element-containing raw powder includes at least one of M element-containing oxide and M element-containing hydroxide.

5. The method as claimed in claim 1, wherein the first atmosphere includes at least one of a nitrogen atmosphere, an argon atmosphere, a $N_2/H_2$ mixed gas atmosphere, a $CO/CO_2$ mixed gas atmosphere, and a helium atmosphere.

6. The method as claimed in claim 1, wherein the first atmosphere is the same as the second atmosphere.

7. The method as claimed in claim 1, wherein press forming the lithium-vanadium-based oxide powder includes forming a pellet having a density of at least about 1.7 g/cm³.

8. The method as claimed in claim 7, wherein grinding the heated press-formed powder includes pulverizing the heated press-formed powder into a compound powder having an average particle diameter of about 1 µm to about 100 µm.

9. The method as claimed in claim 1, wherein the second atmosphere includes at least one of a $N_2/H_2$ mixed gas and a $CO/CO_2$ mixed gas.

10. A method for preparing negative active material for a rechargeable lithium battery, the method comprising:
    preparing a mixed powder by mixing a vanadium-containing raw powder and a lithium-containing raw powder, or by mixing a vanadium-containing raw powder, a lithium containing raw powder, and an M element-containing raw powder, where the M element includes at least one of Al, Cr, Mo, Ti, W, and Zr;
    subjecting the mixed powder to a first heat-treatment at about 500° C. to about 900° C. for about 1 to about 5 hours under a first atmosphere to obtain a lithium-vanadium-based oxide powder;
    press-forming the lithium-vanadium-based oxide powder;
    subjecting the press-formed powder to a second heat-treatment at about 900° C. to about 1400° C. for about 3 to about 10 hours under a second atmosphere that is a reducing atmosphere; and
    grinding the heated press-formed powder to provide a compound powder represented by Formula 1:

$$Li_xM_yV_zO_{2+d} \qquad (1),$$

wherein, in Formula 1, $1 \leq x \leq 2.5$, $0 \leq y \leq 0.5$, $0.5 \leq z \leq 1.5$, $0 \leq d \leq 0.5$, and M is an element including at least one of Al, Cr, Mo, Ti, W, and Zr, and wherein the compound powder includes a multi-faced particle that has a plurality of flattened parts, the multi-faced particle has at least three ridgelines at a boundary between adjacent flattened parts, and at least one of the ridgelines is formed by adjacent flattened parts at an angle of at least 90°.

* * * * *